United States Patent [19]

Debesis et al.

[11] Patent Number: 5,621,548
[45] Date of Patent: Apr. 15, 1997

[54] LASER SCANNER EMPLOYING A HOLELESS HOLOGON DISK AND FABRICATION METHOD THEREFOR

[75] Inventors: John R. Debesis, Penfield; Robert C. Bryant, Honeoye Falls; James S. Newkirk, LeRoy; Richard A. Colleluori, Rochester; Timothy A. Peter, Hilton, all of N.Y.

[73] Assignee: Eastman Kodak Company, Rochester, N.Y.

[21] Appl. No.: 414,892

[22] Filed: Mar. 31, 1995

[51] Int. Cl.⁶ .................................... G02B 5/32
[52] U.S. Cl. .................... 359/18; 359/17; 359/198; 359/209; 235/457
[58] Field of Search .................... 359/17, 18, 198, 359/209; 235/457, 470; 250/236; 358/474, 480, 494

[56] References Cited

U.S. PATENT DOCUMENTS

| | | | |
|---|---|---|---|
| 3,953,105 | 4/1976 | Ih | 359/18 |
| 4,353,615 | 10/1982 | Kramer et al. | 350/3.71 |
| 4,516,159 | 5/1985 | Diepeveen | 358/494 |
| 4,528,448 | 7/1985 | Doggett | 250/231 |
| 4,556,278 | 12/1985 | Schell | 350/3.71 |
| 4,610,500 | 9/1986 | Kramer | 350/3.71 |
| 4,871,904 | 10/1989 | Metilitsky et al. | 235/467 |
| 5,016,955 | 5/1991 | Kocher | 350/3.71 |
| 5,046,794 | 9/1991 | Ritter et al. | 359/18 |
| 5,151,581 | 9/1992 | Krichever et al. | 235/467 |
| 5,172,252 | 12/1992 | Toyoshima et al. | 359/16 |
| 5,295,004 | 3/1994 | Hasegawa et al. | 359/17 |

FOREIGN PATENT DOCUMENTS 61-149917  7/1986  Japan.

*Primary Examiner*—Paul M. Dzierzynski
*Assistant Examiner*—Darren E. Schuberg
*Attorney, Agent, or Firm*—Milton S. Sales; Nelson A. Blish

[57] ABSTRACT

A method for fabricating a holeless hologon disk includes the steps of relatively positioning a disk assembly and a drive shaft assembly in closely spaced relation with the planar surface of the disk normal to the drive shaft's rotational axis. Adhesive is applied between the assemblies and allowed to fix while the relative assembly positions are maintained. In one construction fabricated by such method, the disk assembly comprises a flanged coupling attached to a planar glass disk with compliant adhesive.

6 Claims, 6 Drawing Sheets

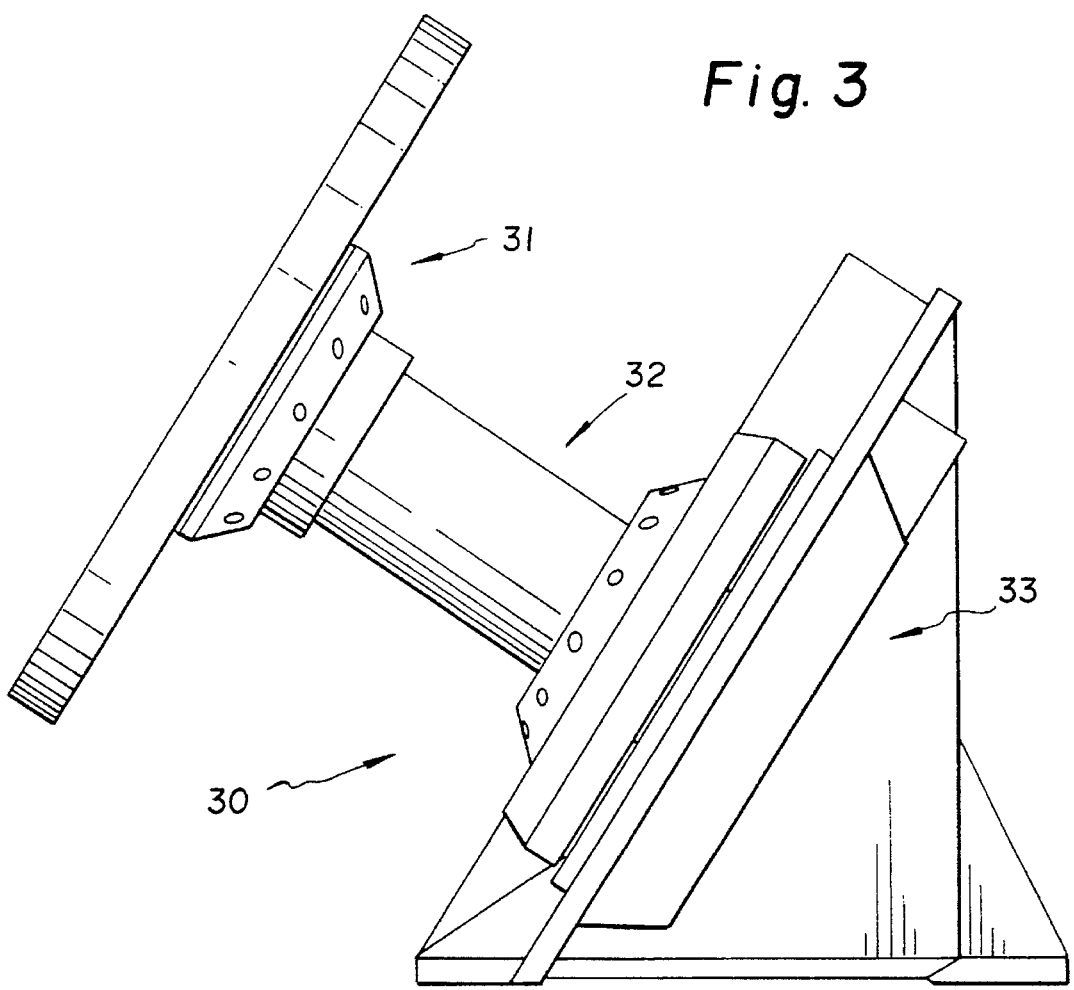
Fig. 3
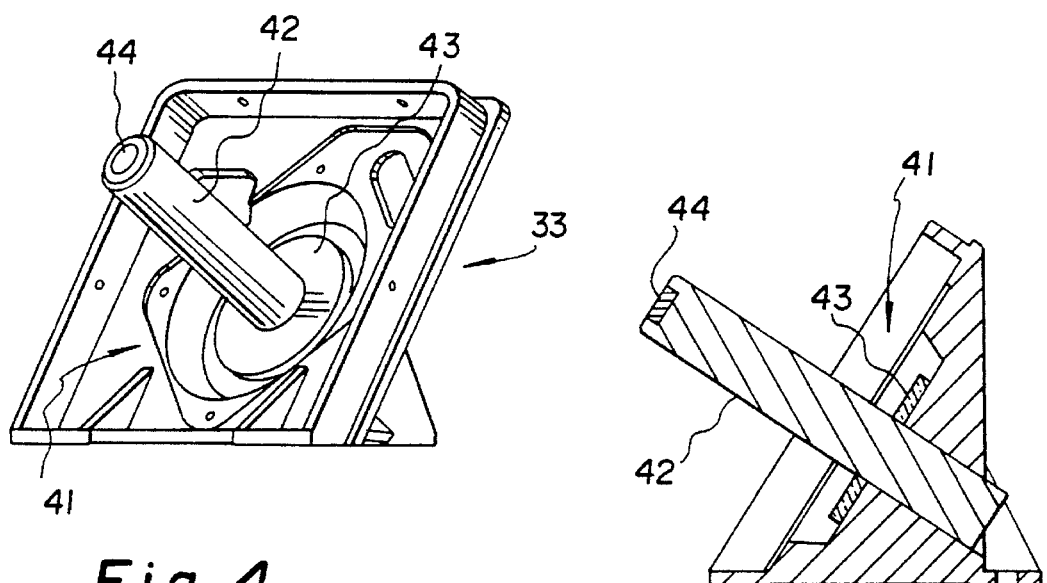
Fig. 4
Fig. 5

LASER SCANNER EMPLOYING A HOLELESS HOLOGON DISK AND FABRICATION METHOD THEREFOR

FIELD OF INVENTION

The present invention relates to improved constructions for scanning a laser beam with a rotating deflector and more specifically to constructions and fabrication methods for employing a holeless hologon as such a beam deflector.

BACKGROUND OF INVENTION

Hologon disks, i.e. disks bearing one or more holographically formed diffraction gratings as facets, have been used as rotating light deflectors in various commercial systems, e.g., shaft position detection/control systems, bar code reader systems and non-impact printing systems. The hologon disks have been embodied in a variety of rotational configurations. For example, U.S. Pat. No. 4,610,500 describes a construction having attachment means extending through the center of the disk to couple it to a rotating shaft. U.S. Pat. No. 5,016,955 discloses a system wherein the disk is engaged around its periphery by an element forming the rotor of a pancake motor. U.S. Pat. No. 4,528,448 suggests constructions where the disk is attached to a rotatable shaft by "some form of adhesive" or even formed on the end of such a shaft.

To a large extent the application for the beam deflector and performance requirements for the output beam determine the constructional forms of hologon scanner to be used. For example, the desired scan rate, the scan spot intensity, the locational accuracy and the intensity uniformity are important considerations. Single facet disks such as described in U.S. Pat. No. 5,046,794 offer certain advantages, e.g.: requiring less precise substrate construction and being susceptible to rim support (without internal stress concentrations caused by a center hole, and thus capable of high rotational speeds). Center-rotated hologon disks that have a plurality of discrete deflection facets disposed around the periphery offer the advantages (over the single facet constructions) of a significantly increased number of scans per revolution and of being more easily embodied to: (i) operate in a transmissive mode using the first order diffraction beam, and (ii) facilitate air cooling. However, the multifacet disks present constructional challenges with respect to substrate and coating thickness uniformity, substrate flexure (due to centrifugal forces and thermal gradients) and substrate cracking due to internal stresses at high speed rotation.

SUMMARY OF INVENTION

Thus, one significant purpose of the present invention is to provide improved construction methods and fabricated embodiments for hologon scanners that provide an annular array of deflection facets on a centrally rotated, holeless disk substrate. One important advantage of such a holeless construction is its capability for high speed rotation without cracking failure. Another advantage of the present invention is the improved coating thickness uniformity which can be provided. Another advantage of the present invention is the improved scan spot uniformity that can be obtained by reducing substrate cupping.

In one aspect the present invention constitutes a method of fabricating a hologon disk that includes the steps of: (i) relatively positioning a disk assembly and drive shaft assembly in a closely spaced relation so that the planar deflector surface of the disk assembly is precisely normal to the rotational axis of the drive shaft assembly; (ii) while holding said assemblies in said closely spaced, precisely normal relation, applying adhesive into the space therebetween; and (iii) continuing to hold the assemblies in their relative positions until said adhesive sets.

In another aspect the present invention constitutes an improved multifacet laser scanner that includes a hologon disk assembly. The disk assembly includes a glass disk with a ring of discrete diffraction gratings on one surface and an antireflection layer on the opposite surface. A flange surface of a coupling member is attached via a compliant adhesive layer to the antireflection disk surface with a drive shaft portion of the coupling member precisely centered on, and generally normal to, the disk surfaces. A drive sleeve of a scanner motor is coupled to the coupling member shaft by an adhesive mass, with the coupling member and drive sleeve rotational axes aligned and with the sleeve axis precisely normal to the disk surfaces.

The invention, and its objects and advantages, will become more apparent in the below description of the preferred embodiments.

BRIEF DESCRIPTION OF DRAWINGS

The subsequent description of preferred embodiments of the invention refers to the accompanying drawings wherein:

FIG. 3 is a side view of another preferred embodiment of laser scanner apparatus constructed in accord with the present invention;

FIG. 4 is a perspective view of a stator-base portion of the FIG. 3 apparatus;

FIG. 5 is a cross-section of the portion shown in FIG. 4;

DETAILED DESCRIPTION OF THE INVENTION

Figure 1:
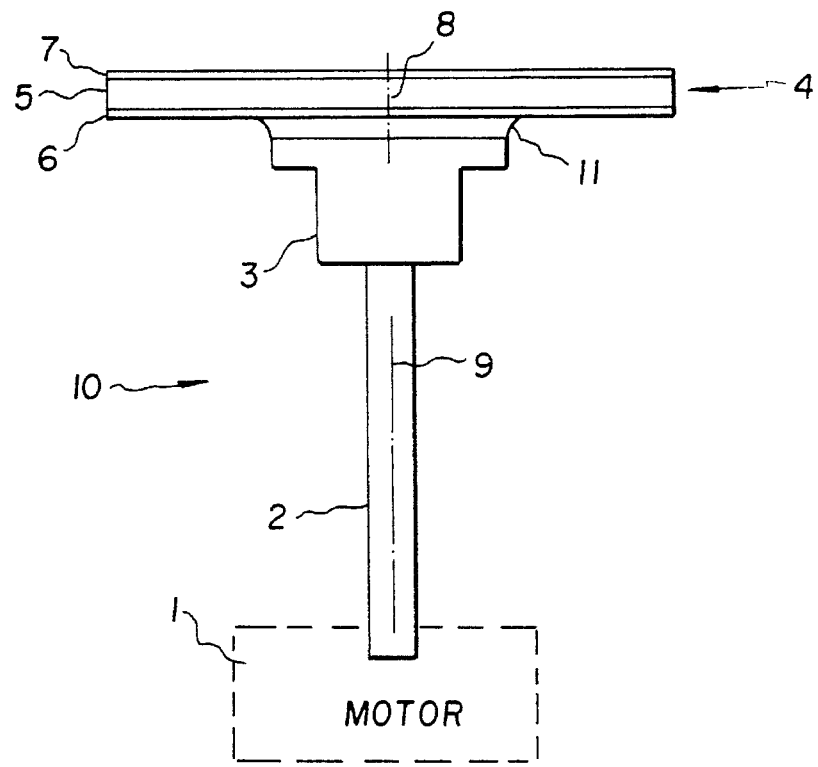
FIG. 1 is a schematic side view of one preferred laser scanner apparatus in accord with the present invention.
Figure 2:
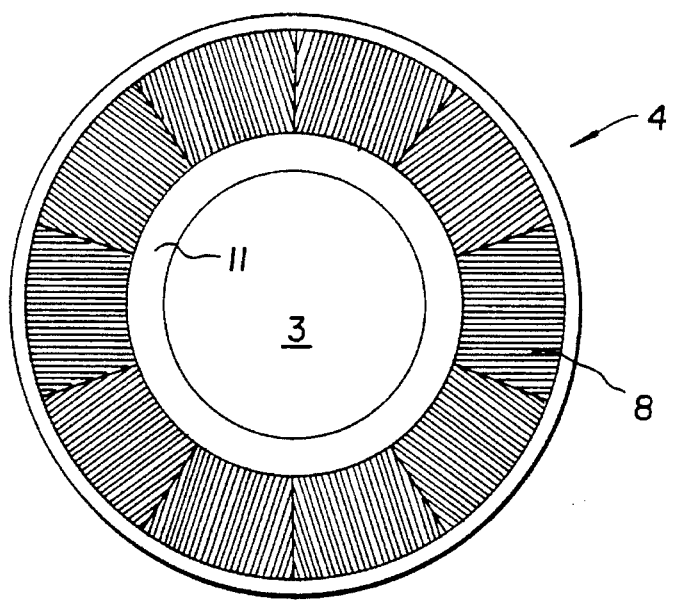
FIG. 2 is a top view of the FIG. 1 apparatus.

The laser scanner embodiment shown in FIGS. 1 and 2 illustrates several significant constructional features according to the present invention. In general, the scanner 10 comprises a motor 1 having a motor shaft 2, which rotates on its longitudinal axis and is coupled to a flange coupling 3. A hologon disk 4 of this embodiment comprises as optical glass disk 5, polished on both faces to a uniform disk thickness, and bearing an antireflection coating 6 on its lower face and photoresist layer 7 on its top face for formation of an annular region of ten discrete diffraction grating facets 8. In accord with important aspects of the invention, described further subsequently, the disk 4 is holeless, i.e has no central aperture for attaching to the hub and motor shaft. Instead, in accord with the present invention the disk 4 is attached to the flange of coupling 3 with a compliant adhesive layer 11 and is positioned visa vis the motor shaft so that the planes of the substrate 5 and layers 6 and 7 are precisely normal to the longitudinal axis of rotation 9 of motor shaft 2 and so that the center axis 8 of the circular substrate 5 is in alignment with the rotational axis 9 of the motor shaft. In one exemplary mode of operation, a laser beam can be directed along a path intersecting a portion of the annular region 8 of the disk 4. As the a facet of region 8 passes through the laser beam from edge to edge it deflects the beam through a given scan angle, to be repeated by each next successive grating facet. Appropriate collection and focusing optics can operate on the deflected beam to form, e.g., raster spot scans across successive lines of a non-impact print zone. Appropriate beam modulation can turn the spot on-off (or otherwise vary its intensity) to accomplish recording of a data or images.

Further preferred constructional details and fabrication processes for manufacturing scanners according to the present invention will be explained by descriptions of the FIGS. 3–8 embodiment of the invention and other subsequent process and material description. Thus, referring to FIG. 3, the multifacet laser scanner 30 comprises in general a hologon disk assembly 31, a motor shaft and rotor assembly 32 and a motor stator and base assembly 33.

The stator and base assembly 33 is shown in more detail in FIGS. 4 and 5 to include a nest 41 for receiving assembly 32 with the hollow rotor shaft 71 (see FIG. 7) and related magnets 72 and circuit boards 73, with stator core 42 (containing magnet 44) centering the assembly and thrust washer 43 providing a bearing surface for the base 74 of the rotor assembly. It will be appreciated that various motor configurations can be utilized and that the modes and constructions for coupling rotor shaft 71 to the hologon disk assembly 31 are the significant aspects according to the invention.

Figure 6:
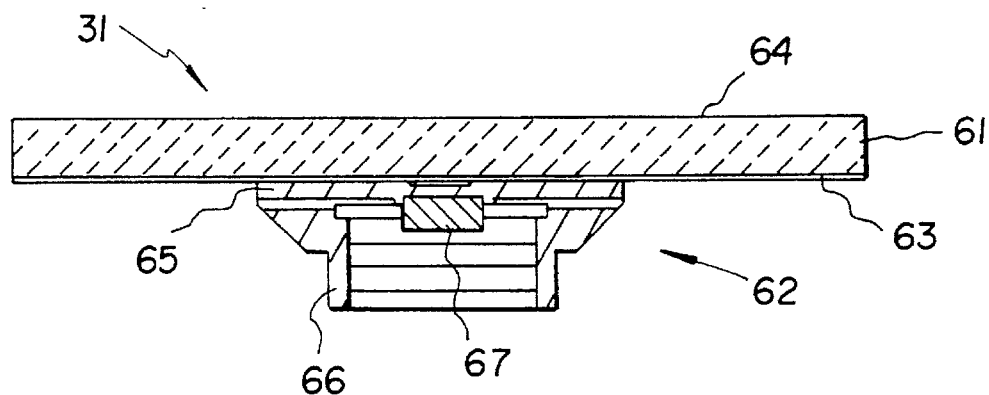
FIG. 6 is a cross-sectional view of a disk assembly portion of the FIG. 3 apparatus.
Figure 7:
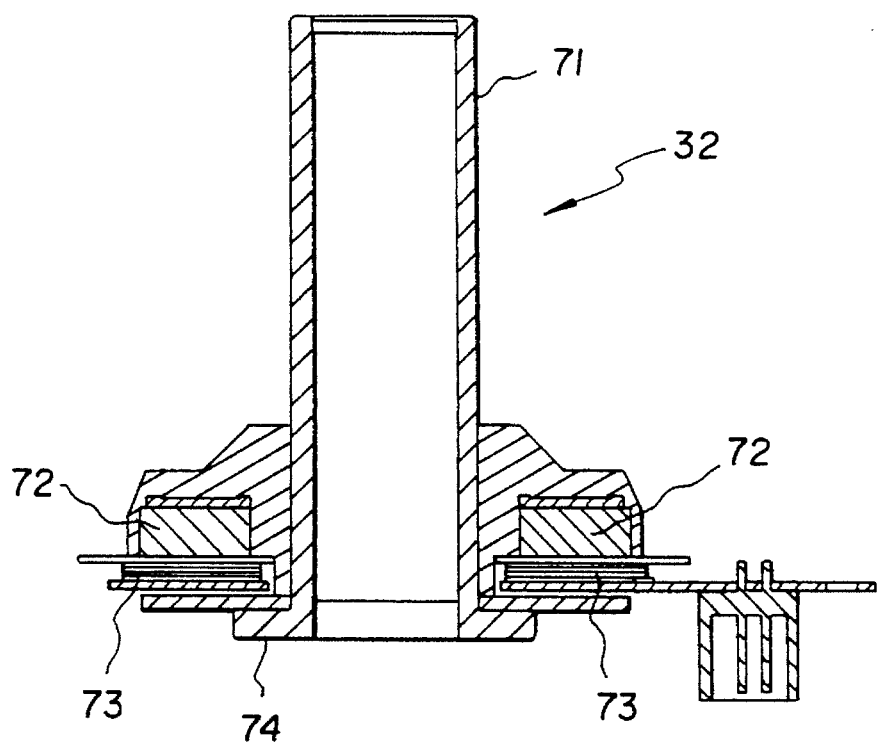
FIG. 7 is a cross-sectional view of a drive shaft assembly portion and rotor assembly portion of the FIG. 3 apparatus.

Referring to FIG. 6, a glass substrate 61 is shown mounted upon flange coupling member 62. The substrate 61 is formed of optical glass and finished on both planar faces to have a uniform thickness at the outer annulus regions where the deflection facets will exist. The substrate surface adjacent flange coupling member 62 has an antireflection layer structure 63 formed thereon. In the preferred construction mode, the diffraction gratings are not formed on the top surface of substrate 61, until the motor is assembled and can be used to spin coat in the diffraction layer fabrication. However, the diffraction facets could be formed on the holeless glass substrate prior to its coupling to the motor drive. In either mode, the photoresist thickness is very uniform when spin coated on the holeless substrate, in contrast to the wedged coating (starting at zero thickness at the disk center) of a central hole disk.

The flange coupling member 62 is formed of a material, such as for example stainless steel, with a thermal expansion characteristic matching that of the glass substrate. Member 62 has a planar flange surface 65 and a depending flange sleeve 66. A magnet 67 is mounted on the back of flange 65 to oppose magnet 44 when assembly is completed. The attachment of flange 65 to antireflection coating is a critical one because substantial stresses can evolve at this interface. The coupling is preceded by cleaning the pertinent region of coating 63 and the flange and then applying a primer coat of "Organofunctional Silane A-1100" primer, sold by Union Carbide Inc. After the primer is cured, an epoxy adhesive mixture with 50 micron beads, which act as spacers to provide a 50 μm bond thickness, is applied between the flange and disk surface to be coupled and the parts are held in a fixture in precisely axially aligned position while the adhesive cures. In particular it is preferred that the adhesive when cured be slightly compliant and a mixture comprising 14.1 grams 3M 2216 Part A with 10.0 grams 3M 2216 Part B and with 0.48 grams 50 micron beads (formed of crosslinked styrene butylacrylate) has been found to provide such a preferred compliance. When the parts have cured in the alignment fixture for about 17 hours, and subsequently ovencured at 60 degrees centigrade for about 6 hours in that fixture, the combined disk/coupling unit as shown in FIG. 6 is ready for alignment and attachment to the rotor shaft 71. Note in particular that the central rotational axes of the disk 61 and coupling 62 are precisely centered to one another but the planar surfaces of the disk 62 are only generally normal to the rotational axes of coupling flange 62. The latter alignment is performed in the subsequent process of attaching the disk assembly (i.e., disk 61 and coupling 62) to rotor shaft 71.

Figure 8:
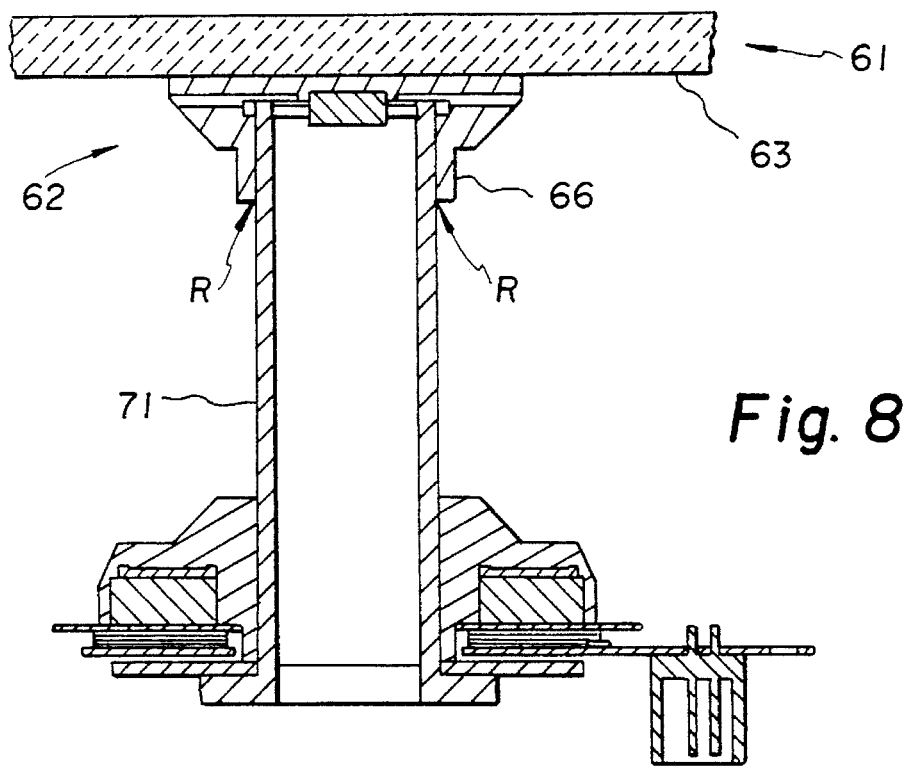
FIG. 8 shows the FIG. 6 assembly adhesively coupled to the FIG. 7 assemblies in accord with the present invention.

Thus, it is important that the diffraction gratings of the hologon intercept the scanned beam identically and for this to occur: (i) the disk plane should rotate normal to the motor axis, (ii) the disk and its layers should be uniformly thick and (iii) the disk should remain substantially planar (without substantial cupping by centrifugal or thermal expansion forces). To obtain a precisely normal attachment between the plane of the disk 61, the shaft 71, the rotor assembly 32 and the disk assembly are held by a fixture in a precise closely spaced relation (as shown in FIG. 8) with the planar disk surface precisely normal to the drive axis of shaft 71 and the coupling, disk and drive axes aligned. A low viscosity adhesive (e.g. EPO-TEK 305 Part A—7.6 grams and Part B—2.1 grams) is then applied by a syringe to the regions R in FIG. 8 and allowed to flowby capillary action to fill the coaxial space between flange 66 and the upper part of sleeve 71 overlapped by the flange 66. ("EPO-TEK" is a trademark identifying products manufactured by Epoxy Technology Inc.). The adhesive is partially cured while holding these parts in the fixture and subsequently over cured for 2 hours at 60 degrees centigrade, out of the fixture.

Figure 11:
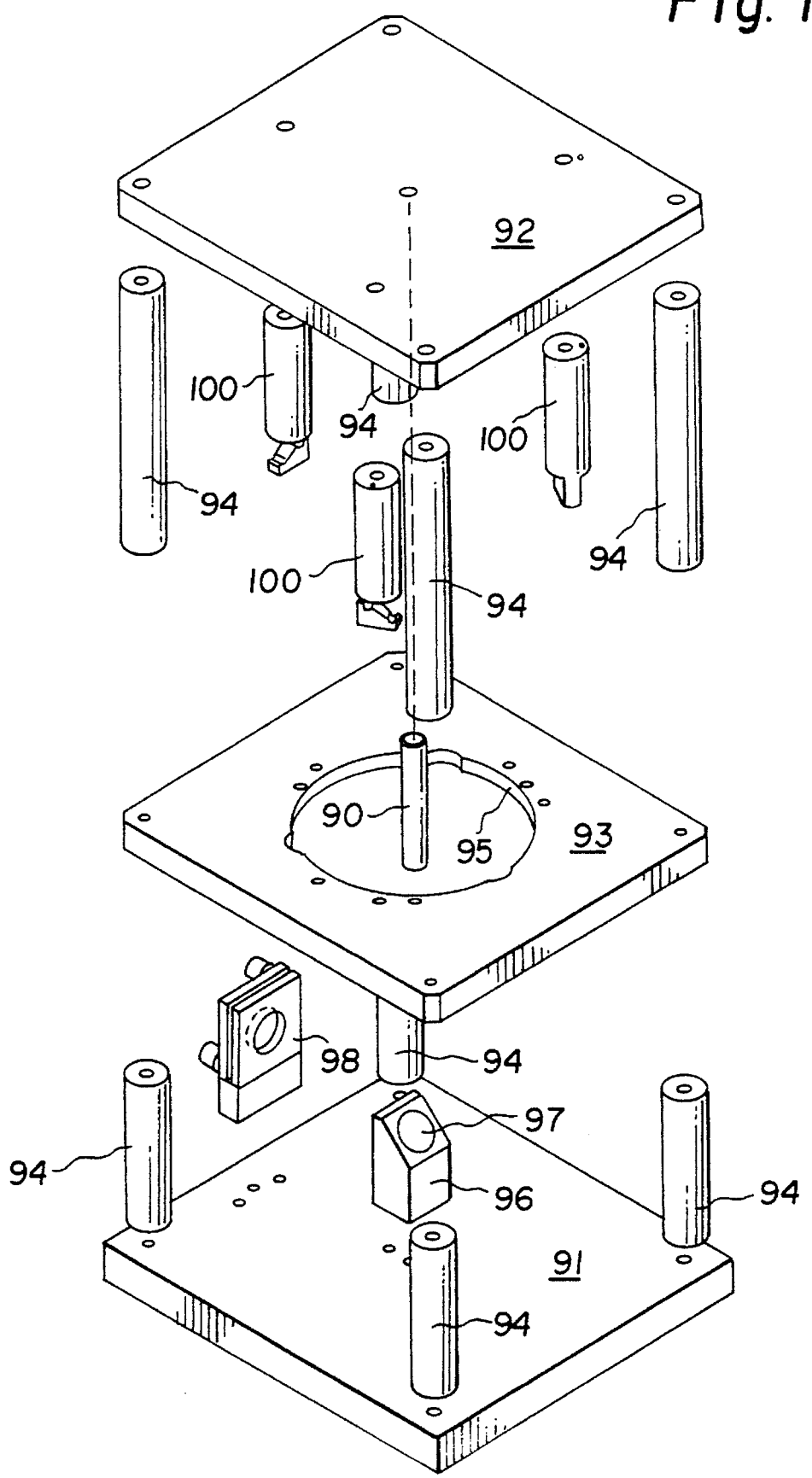
FIGS. 11 and 12 are exploded perspectives of fixtures useful in practice of preferred fabrication methods of the present invention.
Figure 12:
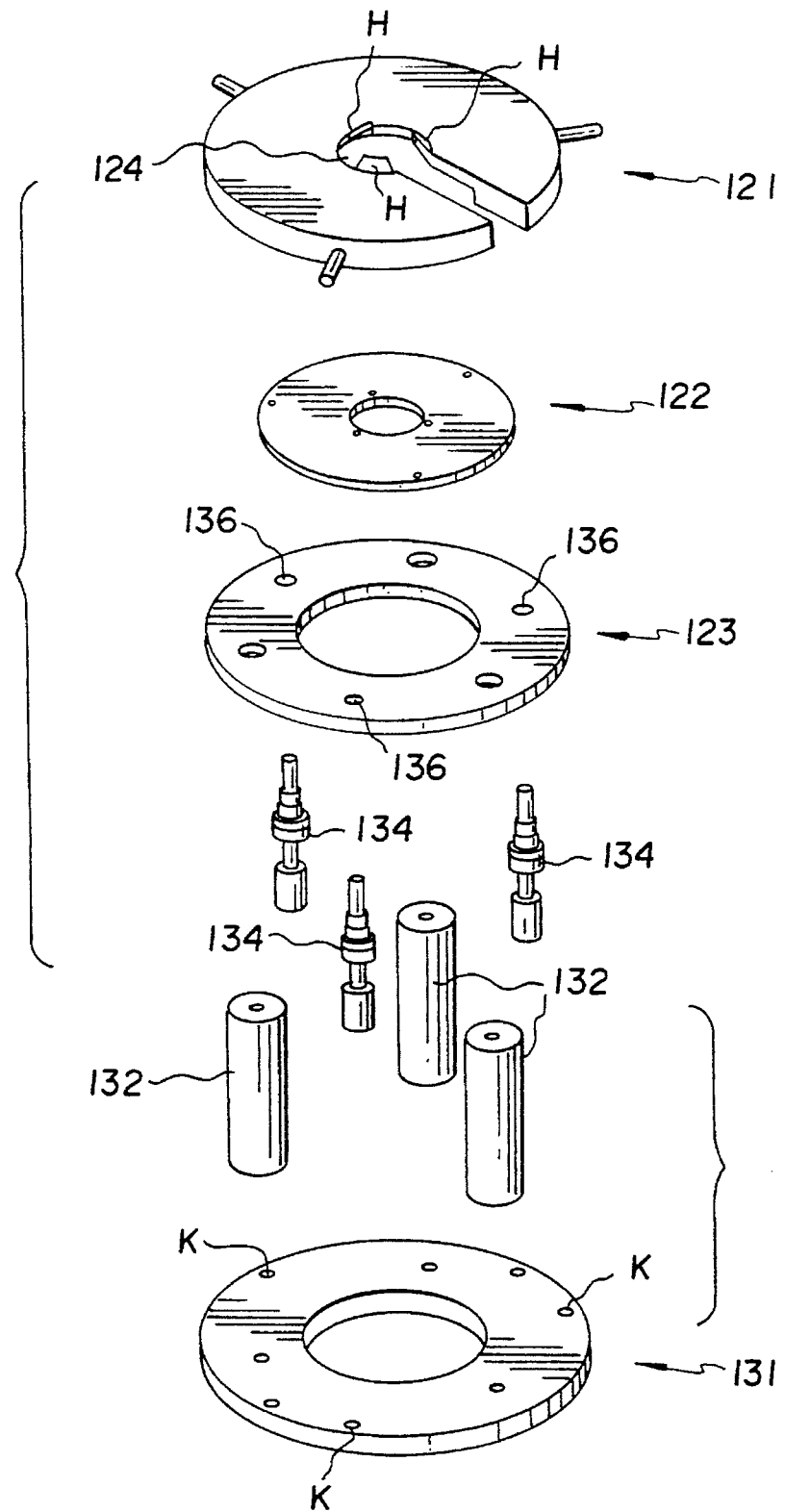

One preferred fixture construction for holding the rotor assembly 32 and disk assembly 31 in the desired interrelations during application and curing of their interbinding adhesive is shown in FIGS. 11 and 12. Thus a main support stand comprises a base 91, a top 92 and mid-plate 93 held in spaced relations by leg members 94. A positioning pin 90 extends from to 92 to a position centered above the opening 95 in mid-plate 93. Main mirror block 96 supports 45° mirror 97 at a centered position above base 91. An adjustment block 98 is an adjunct component which is used during the alignment of the auto collimating telescope to the fixture (and later for verification of alignment). It is set once during the initial alignment of the telescope and fixture to mimic the optical path leading up to the retroflective target. Thus, should the fixture be disturbed for any reason it is a relatively simple matter to look at the stationary mirror to realign the telescope (as opposed to reintroducing the retroreflective target to do the realignment).

To commence the alignment procedure, a reflective target is placed on the end of pin 90 and a telescope is aligned to the fixture. The disk assembly 31 (see FIGS. 3 and 6) is then inserted into a next fixture which is shown in FIG. 12 and comprises a nesting ring 121, and a plexicover 122. The assembly 61 is inserted so that the flange coupling 62 extends through the opening 124 in ring 121 and is fastened in place three screws through holes "H". At this stage, the rotor shaft assembly 32 is slid onto pin 90 upside down, i.e., with the end to be coupled extending downwardly. The nest with its supported disk assembly 31 is then moved into a supported position in the notches of hangers 100 (see FIG. 11) with its coupling sleeve 66 around the downwardly extending end of shaft 71.

A three legged adjustment stand formed of lower ring 131, legs 132 adjustment ring 123 and adjustment screws 134 (see FIG. 12) is then moved into contact with mid-plate 93, and the lower ring 131, which is attached to the mid-plate 93 by screws through holes "K". The adjustment screws 134 extend through opening 136. While auto collimating of lower surface of the hologon through the central openings via mirror block 96, the hologon plane is adjusted to be normal to the supported shaft. Adhesive is then applied to wick into the flange sleeve/shaft interspace and curing is effected e.g. at room temperature for 19 hours while the components are held firmly in their inter-aligned positions. When adhesive curing is complete the combined unit shown in FIG. 8 is removed from the fixture and over cured for 2 hours at 60 degrees centigrade. The unit is then ready for further fabrication and assembly.

Figure 9:
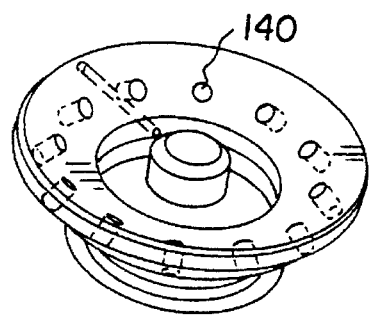
FIG. 9 is a perspective view of showing preferred constructions for the flange coupling member of the disk assembly unit of the present invention.

In one preferred mode the rotor is now moved to a stator/coating station and a photoresist layer 68 (see FIG. 10) is spin coated to a uniform thickness across the top planar face 64 of the glass substrate 61. Because of the holeless configuration, the resist uniformity is typically better than one-tenth wavelength, which substantially enhances the optical power and deflection uniformity of the system. The photoresist is allowed to dry and then holographically exposed to form a plurality of latent diffraction grating images around an annulus in a manner known in the art. The exposed photoresist images are then developed to form diffraction grating facets 8 as shown in FIG. 1. After this procedure, the hologon rotor can be mounted in its permanent stator nest and dynamically balanced by removing or adding masses at appropriate locations 140 (see FIG. 9) in a known manner. Three of the holes 140 are also used to temporarily secure nesting ring 121 during the alignment described above.

Figure 10:
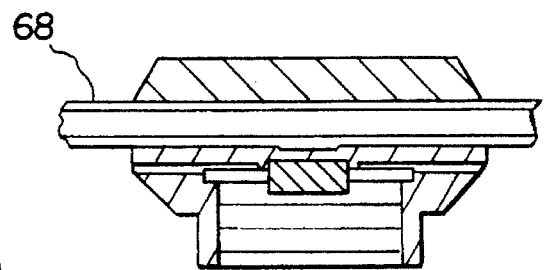
FIG. 10 a cross-sectional view like FIG. 6 but showing another preferred constructional feature for practice of the present invention.

There is a natural pumping action which circulates air across the disk surfaces during rotation and this reduces thermal deformations of the disk surface. FIG. 10 shows another preferred construction for minimizing thermally caused deformation. In this embodiment a metal disk 150 having thermal characteristics similar to the flange surface 65 is attached to the top planar surface of the glass substrate opposite flange 65. This equalizes the thermal and centrifugally-induced stresses on each side of the glass substrate to reduce cupping of the disk in one direction or the other.

With the construction and assembly procedure described above according to the invention, the glass disk is covered on both sides. The flange side is protected by antireflection coating, adhesive and the flange. The other side is covered with photoresist (or in the FIG. 10 embodiment, with photoresist, adhesive and a metal plate). This encapsulation of the glass prevents it from corroding in the atmosphere and obviates the microcracks incident to such corrosion, which can weaken the glass and cause it to fracture. Thus, the invention further provides a disk passivation that prevents weathering and affords a more robust system.

The invention has been described in detail with particular reference to preferred embodiments thereof, but it will be understood that variations and modifications can be effected within the spirit and scope of the invention.

We claim:

1. A method of fabricating a hologon disk scanner comprising the steps of:

a. attaching a continuous disk substrate formed of non-apertured optical glass, into a precisely centered position upon a planar flange surface of a flange coupling by means of a compliant adhesive to form a disk assembly;

b. adhering a disk of matched size and thermal expansion properties to the planar flange surface of the flange coupling onto a surface of said disk that is opposite said flange;

c. positioning said disk assembly and a drive shaft assembly in a predetermined spaced relation such that a planar deflection surface of said disk assembly is precisely normal to and precisely centered on a rotational axis of said drive shaft assembly; and d. applying adhesive into the space between said drive shaft assembly and said disk assembly while holding them in said predetermined relation; and e. continuing to hold said predetermined relation while said adhesive sets.

2. The invention defined in claim 1 further comprising the steps of rotating the combined disk and shaft assemblies on said axis while spin coating a uniform thickness layer of photoresist material over said planar surface and thereafter holographically exposing and developing said layer to form a plurality of discrete diffraction grating patterns around an annular region spaced from the center said disk.

3. The method of fabrication defined in claim 1 wherein the optical glass surface facing said flange coupling bears an antireflection coating and said compliant adhesive couples said antireflection coating to the planar flange surface of said flange coupling.

4. A method of fabricating a hologon disk scanner comprising the steps of:

a. forming an antireflection coating on a first planar surface of a continuous optical glass disk substrate having uniform thickness;

b. with a compliant adhesive, adhering a planar flange face of a flanged shaft coupling to the antireflection coating on said first disk surface so that the axis of the coupling is precisely centered visa vis the disk and generally normal to said disk surface;

c. holding the coupling in closed spaced relation to a drive shaft with the planar disk surface precisely normal to the rotational drive axis of shaft and with the coupling and drive shaft axes in precise interalignment;

d. supplying adhesive into the space between said coupling and shaft and holding said precisely normal and aligned positions while the adhesive sets;

e. mounting said drive shaft in a rotary system;

f. rotating said drive shaft while coating a photoresist layer of uniform thickness on a disk surface opposite said antireflection coating;

g. holographically exposing and developing the photoresist to form a plurality of discrete diffraction grating facets disposed around an outer annulus of said disk; and h. adhering a deflection control element, with thermal expansion properties matched to the flange face of said coupling disk face opposite said coupling.

5. A multifacet laser scanner comprising:

a. a hologon disk assembly including an optical glass disk having uniformly spaced face surfaces with an annular region of discrete diffraction gratings on one face surface and an antireflection layer on the other surface;

b. a flange coupling member having a planar surfaced flange and a depending shaft;

c. a compliant epoxy adhesive layer coupling said flange to said antireflection layer with the rotational axis of said coupling centered vis a vis the center axis of said disk and generally normal to said disk face surfaces;

d. motor means including a drive shaft, having an axis of rotation;

e. an adhesive mass coupling said drive sleeve to said coupling with said coupling and said shaft axes aligned, and with said shaft axis precisely normal to said disk faces; and f. a thermal control element having thermal expansion characteristics matching said flange, coupled to said disk face in opposition to said flange.

6. The invention defined in claim 5 wherein said diffraction gratings are formed of photoresist material.

* * * * *